US012580412B2

(12) United States Patent
Bhise et al.

(10) Patent No.: US 12,580,412 B2
(45) Date of Patent: Mar. 17, 2026

(54) HIGH EFFICIENCY LINE VFI UPS INVENTION

(71) Applicant: SCHNEIDER ELECTRIC IT CORPORATION, Foxboro, MA (US)

(72) Inventors: Kapil Sunil Bhise, Bengaluru (IN); Pradeep Tolakanahalli Nagabhushanrao, Bangalore (IN)

(73) Assignee: Schneider Electric IT Corporation, Foxborough, MA (US)

( * ) Notice: Subject to any disclaimer, the term of this patent is extended or adjusted under 35 U.S.C. 154(b) by 0 days.

(21) Appl. No.: 18/808,137

(22) Filed: Aug. 19, 2024

(65) Prior Publication Data

US 2025/0047130 A1 Feb. 6, 2025

(30) Foreign Application Priority Data

Aug. 1, 2023 (IN) .............................. 202311051538

(51) Int. Cl.
*H02J 9/06* (2006.01)
(52) U.S. Cl.
CPC ..................................... *H02J 9/06* (2013.01)
(58) Field of Classification Search
CPC .. H02J 9/06; H02J 9/061; H02J 7/0031; H02J 7/0034; H02J 7/0047
See application file for complete search history.

(56) References Cited

U.S. PATENT DOCUMENTS

| | | | |
|---|---|---|---|
| 6,912,145 B2 | 6/2005 | Hung et al. | |
| 6,960,901 B2 | 11/2005 | Wu et al. | |
| 7,072,194 B2 | 7/2006 | Nayar et al. | |
| 7,733,670 B2 | 6/2010 | Feng et al. | |
| 8,698,354 B2 | 4/2014 | Ghosh et al. | |
| 2016/0105098 A1* | 4/2016 | Savulak .................. | H02J 7/345 |
| | | | 323/234 |
| 2019/0181677 A1* | 6/2019 | Toyoda ............. | H02M 3/33584 |
| 2022/0376548 A1 | 11/2022 | Zhang et al. | |

FOREIGN PATENT DOCUMENTS

JP          2005229666 A          8/2005

* cited by examiner

*Primary Examiner* — Alex W Lam
(74) *Attorney, Agent, or Firm* — Patterson + Sheridan, LLP

(57) ABSTRACT

Examples of the disclosure include a power system comprising a first output configured to be coupled to a load, a second output configured to be coupled to the load, a first input configured to be coupled to a power source, a second input configured to be coupled to the power source, a switch configured to switchably couple the second input to the second output, a series power injector coupled to a capacitor, the capacitor being coupled in series with the second output, and at least one controller configured to control the switch to couple the second input to the second output, and disable, based on controlling the switch to couple the second input to the second output, an inverter output power to the load.

20 Claims, 4 Drawing Sheets

HIGH EFFICIENCY LINE VFI UPS INVENTION

CROSS-REFERENCE TO RELATED APPLICATION

This application claims the benefit under 35 U.S.C. § 119 of Indian Patent Application No. 202311051538, filed Aug. 1, 2023, and titled A NOVEL HIGH EFFICIENCY LINE VFI UPS INVENTION, which is hereby incorporated herein by reference in its entirety for all purposes.

BACKGROUND

1. Field of the Disclosure

At least one example in accordance with the present disclosure relates generally to power devices.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

According to at least one aspect of the present disclosure, a power system is provided comprising a first output configured to be coupled to a load, a second output configured to be coupled to the load, a first input configured to be coupled to a power source, a second input configured to be coupled to the power source, a switch configured to switchably couple the second input to the second output, a series power injector coupled to a capacitor, the capacitor being coupled in series with the second output, and at least one controller configured to control the switch to couple the second input to the second output, and disable, based on controlling the switch to couple the second input to the second output, an inverter output power to the load.

In at least one example, the power system includes an AC/DC converter coupled to the first input at a first connection and coupled to a DC bus at a second connection, and a DC/AC inverter coupled to the DC bus at a first connection and to the first output at a second connection, the DC/AC inverter being configured to provide the inverter output power to the load. In at least one example, the series power injector is coupled in parallel with a combination of the AC/DC converter and the DC/AC inverter. In at least one example, the at least one controller is further configured to control the switch to decouple the second input from the second output, and control the AC/DC converter and the DC/AC inverter to provide the inverter output power to the load. In at least one example, the at least one controller is configured to control the switch to decouple the second input from the second output responsive to determining that input power received from the power source does not satisfy at least one acceptable-power criterion. In at least one example, the power system includes a DC/DC converter coupled to a DC bus at a first connection and being configured to be coupled to an energy-storage device at a second connection. In at least one example, the series power injector is coupled to the DC/DC converter and is configured to be coupled to the energy-storage device. In at least one example, the series power injector is coupled to the DC/DC converter, and is coupled in parallel with the capacitor. In at least one example, the at least one controller is configured to determine a received voltage of power received at the second input, determine a rated voltage of the load, determine a voltage difference between the received voltage and the rated voltage, and control the series power injector to generate the voltage difference across the capacitor.

In at least one example, the received voltage is greater than the rated voltage. In at least one example, the received voltage is less than the rated voltage. In at least one example, the series power injector is coupled in parallel with the capacitor. In at least one example, the capacitor is coupled in series with the switch. In at least one example, the first input is coupled to the second input. In at least one example, the first output is coupled to the second output. In at least one example, the power system includes a DC/AC inverter coupled to the first output and being configured to provide the inverter output power to the load, wherein disabling the inverter output power to the load includes the at least one controller controlling the DC/AC inverter to stop providing the inverter output power to the load.

According to at least one aspect of the disclosure, a non-transitory computer-readable medium storing thereon sequences of computer-executable instructions for controlling a power system having a first output configured to be coupled to a load, a first input configured to be coupled to a power source, a switch configured to switchably couple the first input to the first output, and a series power injector coupled to a capacitor, the capacitor being coupled in series with the first output is provided, the sequences of computer-executable instructions including instructions that instruct at least one processor to control the switch to couple the first input to the first output via the capacitor, and disable, based on controlling the switch to couple the first input to the first output, an inverter output power to the load.

In at least one example, the at least one processor is further configured to determine a received voltage of power received at the first input, determine a rated voltage of the load, determine a voltage difference between the received voltage and the rated voltage, and control the series power injector to generate the voltage difference across the capacitor. In at least one example, the received voltage is greater than the rated voltage. In at least one example, the received voltage is less than the rated voltage.

According to at least one aspect of the disclosure, a method of controlling a power system having a first output configured to be coupled to a load, a first input configured to be coupled to a power source, a switch configured to switchably couple the first input to the first output, and a series power injector coupled to a capacitor, the capacitor being coupled in series with the first output is provided, the method comprising controlling the switch to couple the first input to the first output via the capacitor, and disabling, based on controlling the switch to couple the first input to the first output, an inverter output power to the load.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
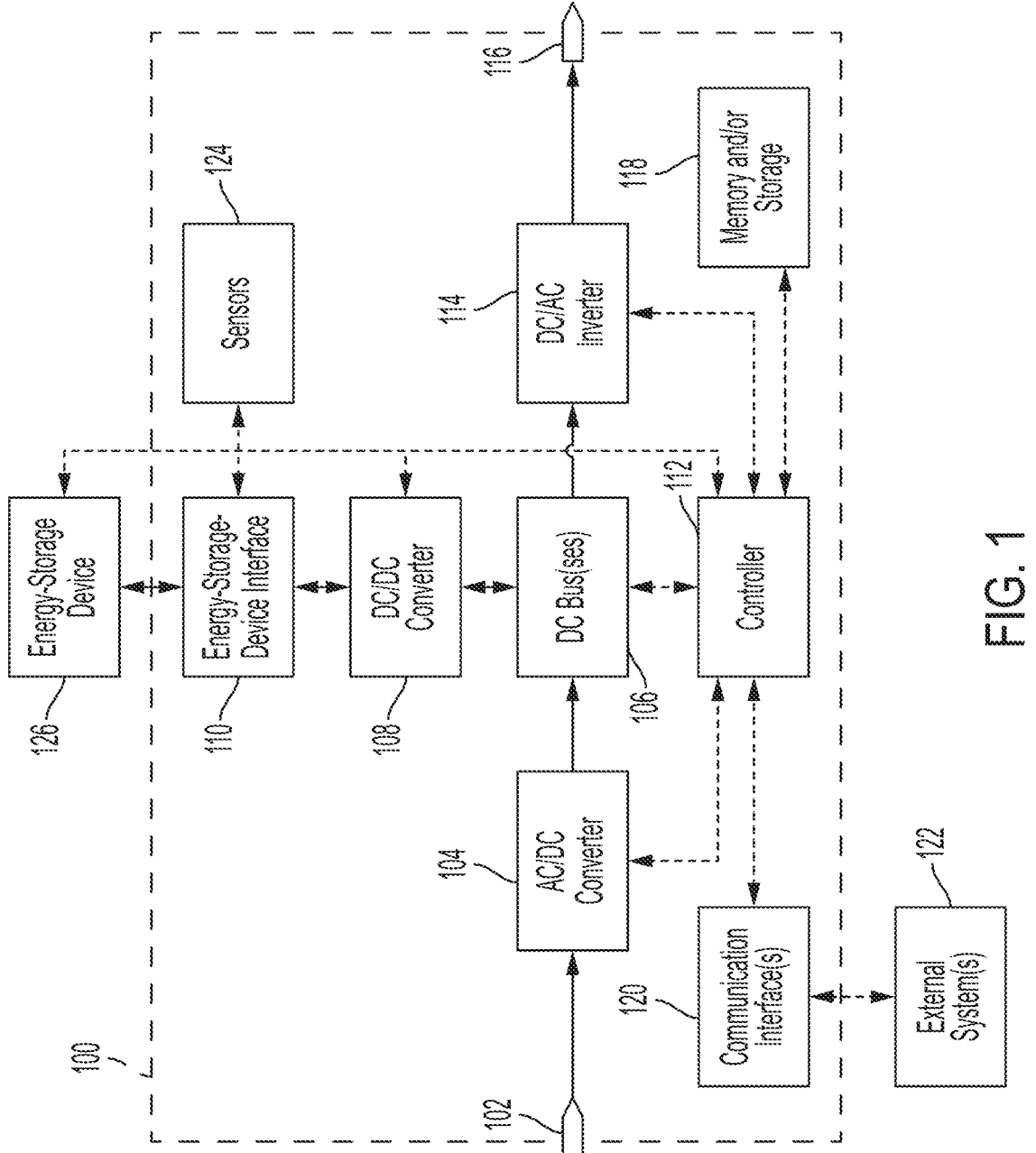
FIG. 1 illustrates a block diagram of an uninterruptible power supply (UPS) according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, uninterruptible power supplies (UPSs) may be used to provide uninterrupted power to one or more loads. Several different types of UPSs exist. Some UPSs include an input rectifier to convert input AC power to DC power and an output inverter to convert the DC power to output AC power. Such "double-conversion" may adversely impact efficiency of the UPS, because power may be lost during the conversion process.

Accordingly, some UPSs include a bypass line. A bypass line selectively connects the UPS input directly to the UPS output, bypassing the rectifier and inverter. The bypass line may be used when the input power is suitable for provision to the load without using the converter and the inverter to condition the power. While efficiency may be increased, the quality of the output power may be adversely impacted by the lack of conditioning.

Examples of the disclosure provide power devices having a rectifier coupled to an inverter, and a capacitor coupled in parallel with the rectifier-and-inverter combination. In some examples, a series power injector is coupled to the capacitor. The power devices may be configured, responsive to certain conditions being met, to direct input power from an input to an output through the capacitor, bypassing the rectifier-and-inverter combination and thereby improving efficiency. The series power injector may draw or inject power from or to the capacitor to correct small deviations between the input power and the rated output power. Accordingly, the power devices may improve efficiency by enabling a large portion of the input power to bypass the double-conversion circuitry, while still maintaining high output-power quality by drawing or injecting small amounts of power as desired.

FIG. 1 is a block diagram of a UPS 100 according to an example. The UPS 100 includes one or more inputs 102 ("input 102"), an AC/DC converter 104, one or more DC busses 106, a DC/DC converter 108, an energy-storage-device interface 110, at least one controller 112 ("controller 112"), a DC/AC inverter 114, one or more outputs 116 ("output 116"), a memory and/or storage 118, one or more communication interfaces 120 ("communication interfaces 120"), which may be communicatively coupled to one or more external systems 122 ("external systems 122"), and one or more voltage sensors and/or current sensors 124 ("sensors 124").

The input 102 is coupled to the AC/DC converter 104 and to an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the energy-storage-device interface 110, and is communicatively coupled to the controller 112. The energy-storage-device interface 110 is coupled to the DC/DC converter 108, and is configured to be coupled to at least one energy-storage device 126 and/or another energy-storage device. In some examples, the energy-storage-device interface 110 is configured to be communicatively coupled to the controller 112.

In some examples, the UPS 100 may be external to the at least one energy-storage device 126 and may be coupled to the at least one energy-storage device 126 via the energy-storage-device interface 110. In various examples, the UPS 100 may include one or more energy-storage devices, which may include the at least one energy-storage device 126. The at least one energy-storage device 126 may include one or more batteries, capacitors, flywheels, or other energy-storage devices in various examples.

The DC/AC inverter 114 is coupled to the one or more DC busses 106 and to the output 116, and is communicatively coupled to the controller 112. The output 116 is coupled to the DC/AC inverter 114, and to an external load (not pictured). The controller 112 is communicatively coupled to the AC/DC converter 104, the one or more DC busses 106, the DC/DC converter 108, the energy-storage-device interface 110, the DC/AC inverter 114, the memory and/or storage 118, the communication interfaces 120, and/or the at least one energy-storage device 126. The sensors 124 are communicatively coupled to the controller 112 and may be coupled to one or more other components of the UPS 100, such as the input 102, the AC/DC converter 104, the one or more DC busses 106, the DC/DC converter 108, the energy-storage-device interface 110, the DC/AC inverter 114, and/or the output 116.

The input 102 is configured to be coupled to an AC mains power source and to receive input AC power having an input voltage level. The UPS 100 is configured to operate in different modes of operation based on the input voltage of the AC power provided to the input 102. The controller 112 may determine a mode of operation in which to operate the UPS 100 based on whether the input voltage of the AC power is acceptable. The controller 112 may include or be coupled to one or more sensors, such as the sensors 124, configured to sense parameters of the input voltage. For example, the sensors 124 may include one or more voltage and/or current sensors coupled to the input 102 and being configured to sense information indicative of a voltage at the input 102 and provide the sensed information to the controller 112.

When AC power provided to the input 102 is acceptable (for example, by having parameters, such as an input voltage value, that meet specified values, such as by falling within a range of acceptable input voltage values), the controller 112 controls components of the UPS 100 to operate in a normal mode of operation, also referred to as a double-conversion mode of operation. In the normal mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the energy-storage-device interface 110. The energy-storage-device interface 110 receives the converted DC power, and provides the converted DC power to the at least one energy-storage device 126 to charge the at least one energy-storage device 126. The DC/AC inverter 114 receives DC power from the one or more DC busses 106, converts the DC power into regulated AC power, and provides the regulated AC power to the output 116 to be delivered to a load.

When AC power provided to the input 102 from the AC mains power source is not acceptable (for example, by having parameters, such as an input voltage value, that do not meet specified values, such as by falling outside of a range of acceptable input voltage values), the controller 112 controls components of the UPS 100 to operate in a backup mode of operation. In the backup mode of operation, DC power is discharged from the at least one energy-storage device 126 to the energy-storage-device interface 110, and the energy-storage-device interface 110 provides the discharged DC power to the DC/DC converter 108. The DC/DC converter 108 converts the received DC power and distributes the DC power amongst the one or more DC busses 106. For example, the DC/DC converter 108 may evenly distribute the power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116.

In some examples, the sensors 124 may include one or more sensors coupled to one or more of the foregoing components such that a voltage and/or current of one or more of the foregoing components may be determined by the controller 112. The controller 112 may store information in, and/or retrieve information from, the memory and/or storage 118. For example, the controller 112 may store information indicative of sensed parameters (for example, input-voltage values of the AC power received at the input 102) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the UPS 100, such as a server, database, laptop computer, desktop computer, tablet computer, smartphone, central controller or data-aggregation system, other UPSs, and so forth.

Accordingly, input AC power received at the input 102 is converted to DC power by the AC/DC converter 104, provided to the DC/AC inverter 114 via the DC busses 106, and converted back to AC power by the DC/AC inverter 114. As discussed above, power efficiency may be adversely impacted by the double-conversion of the input power.

Figure 2:
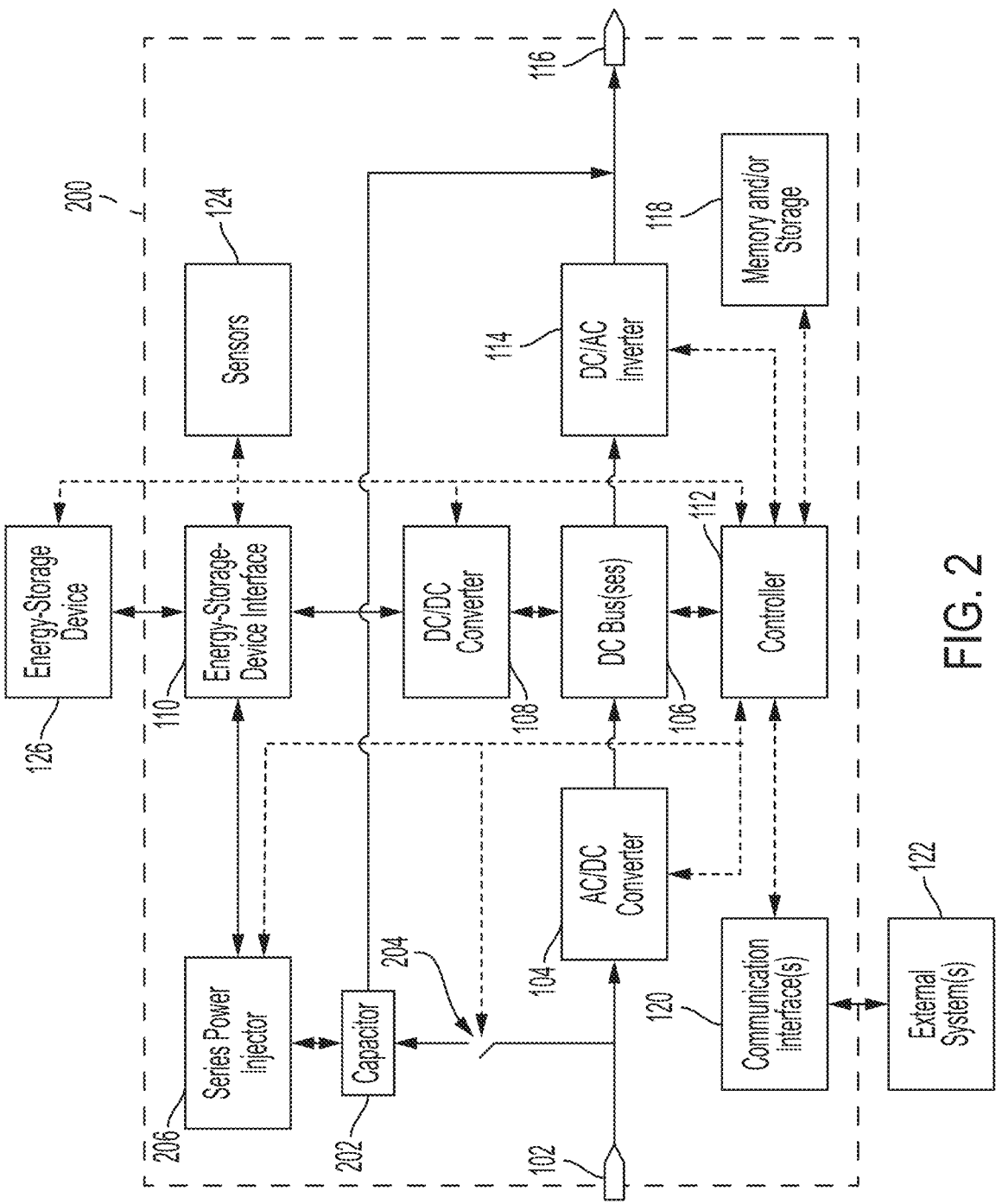
FIG. 2 illustrates a block diagram of a UPS according to another example.

FIG. 2 illustrates a block diagram of a UPS 200 according to another example. The UPS 200 is similar to the UPS 100, and like components are labeled accordingly. In addition, the UPS 200 includes a capacitor 202, at least one switching device 204 ("switch 204"), and a series power injector 206.

The switch 204 is coupled to the input 102 at a first connection, is coupled to the capacitor 202 at a second connection, and is communicatively coupled to the controller 112. The capacitor 202 is coupled to the switch 204 at a first connection, is coupled to the output 116 at a second connection, and is coupled to the series power injector 206 at a third connection. The series power injector 206 is coupled to the capacitor 202 at a first connection, is coupled to the energy-storage-device interface 110 at a second connection, and is communicatively coupled to the controller 112.

As discussed above with respect to FIG. 1, the controller 112 may operate the UPS 100 in various modes of operation depending at least in part on input-power parameters of the input power received at the input 102. Similarly, the controller 112 may control the UPS 200 to operate in one of at least three modes of operation based at least in part on the input-power parameters, including a pass-through mode, a double-conversion mode, and a backup mode.

Figure 3:
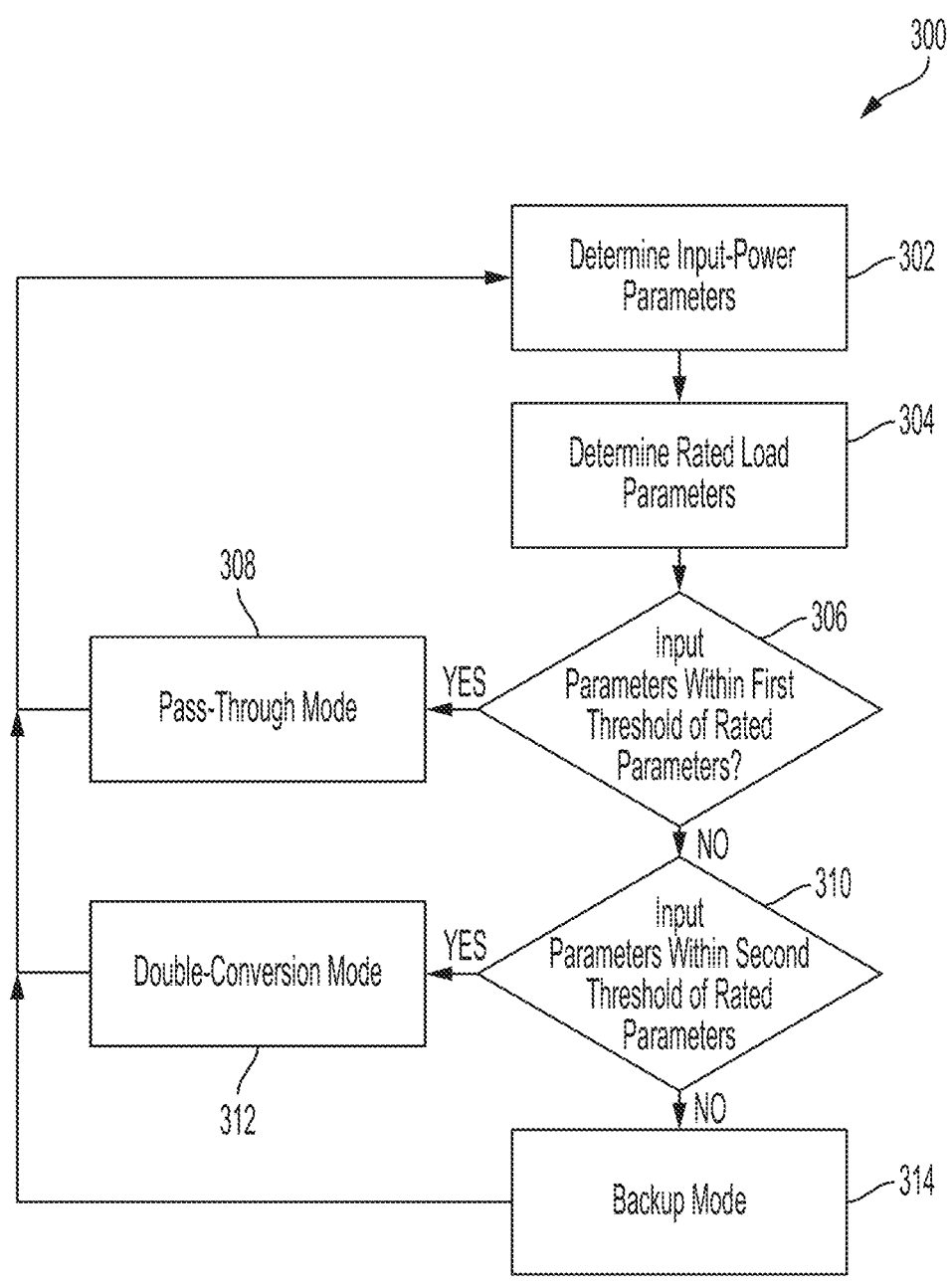
FIG. 3 illustrates a process of operating the UPS of FIG. 2 according to an example.

FIG. 3 illustrates a process 300 of operating the UPS 200 according to an example. The process 300 may be executed at least in part by the controller 112. The process 300 may provide an example of the controller 112 determining a mode of operation in which to control the UPS 200.

At act 302, the controller 112 determines one or more input-power parameters. Input-power parameters may include parameters descriptive of input power received at the input 102. For example, input-power parameters may include voltage information, current information, frequency information, and so forth. The sensors 124 may sense the input-power parameters, and the controller 112 may receive the sensed information from the sensors 124 to determine the one or more input-power parameters.

At act 304, the controller 112 determines one or more rated-power parameters of a load coupled to the output 116. The rated-power parameters may include parameters descriptive of the power that the load is rated to receive, such as a rated voltage, current, frequency, and so forth. The memory and/or storage 118 may store the rated-power parameters in some examples, and/or the controller 112 may communicate with the load to determine the rated-power parameters in various examples.

At act 306, the controller 112 determines whether the one or more input-power parameters are within a first threshold range or ranges of the rated-power parameters. For example, the controller 112 may determine if a value of the input voltage is within a first threshold range of a value of the rated voltage, potentially in addition to other parameters. If the rated voltage is 220 VAC, for example, the controller 112 may determine whether the value of the input voltage is within a range of 170 VAC-270 VAC, that is, within 50 VAC of the rated voltage. In other examples, other ranges may be implemented. If the controller 112 determines that the one or more input-power parameters are within the first threshold range or ranges of the rated-power parameters (306 YES), then the process 300 continues to act 308.

At act 308, the controller 112 operates the UPS 200 in the pass-through mode of operation. In one example of the pass-through mode, the controller 112 controls the switch 204 to close such that input power received at the input 102 is provided to the output 116 via the capacitor 202, at least partially bypassing the AC/DC converter 104 and the DC/AC inverter 114. The controller 112 may also control the DC/AC inverter 114 to disable providing output power to the output 116 and/or may control the AC/DC converter 104 to disable drawing input power from the input 102.

As discussed in greater detail below, the controller 112 may also determine deviations between the input power and the rated power and control the series power injector 206 to compensate for any deviations by drawing or providing power from or to the capacitor 202 in the pass-through mode of operation. In some examples, excess power may be drawn from the capacitor 202 and a current may be provided from the series power injector 206 to the output 116 via the DC/AC inverter 114. However, the DC/AC inverter 114 may be considered to have its inverter output power disabled inasmuch as the DC/AC inverter 114 is not providing power received from the input 102 via the AC/DC converter 104 to the output 116. The process 300 may then return to act 302, whereby the controller 112 repeats acts 302-306.

Returning to act 306, if the controller 112 determines that the input-power parameters are not within the first threshold range or ranges of the one or more rated-power parameters (306 NO), then the process 300 continues to act 310.

At act 310, the controller 112 determines whether the input-power parameters are within a second threshold range or ranges of the one or more rated-power parameters. For example, the controller 112 may determine if a value of the input voltage is within a second threshold range of a value of the rated voltage, potentially in addition to other parameters. In some examples, the second threshold range is similar to the first threshold range but encompasses a wider range of values. If the rated voltage is 220 VAC, for example, the controller 112 may determine whether the value of the input voltage is within a range of 100 VAC-340 VAC, that is, within 120 VAC of the rated voltage. In other examples, other ranges may be implemented. If the controller 112 determines that the one or more input-power parameters are within the second threshold range or ranges of the rated-power parameters (310 YES), then the process 300 continues to act 312.

At act 312, the controller 112 operates the UPS 200 in the double-conversion mode of operation. In one example of the double-conversion mode, the controller 112 controls the switch 204 to open such that the capacitor 202 is decoupled from the input 102. The double-conversion mode may be substantially similar or identical to the normal mode of operation discussed above with respect to the UPS 100. For example, the controller 112 may operate the AC/DC converter 104 to convert AC input power to DC power, provide the DC power to the DC/AC inverter 114 via the DC busses 106, and control the DC/AC inverter 114 to convert the DC power to the AC power provided to the output 116. The input-power parameters being outside of the first range but within the second range may indicate that the input power deviates too far from the rated power for the series power injector 206 to effectively compensate for the deviations, but not so far that double-conversion of the input power by the AC/DC converter 104 and the DC/AC inverter 114 is not feasible. The process 300 may then return to act 302, whereby the controller 112 repeats acts 302-310.

Returning to act 310, if the controller 112 determines that the input-power parameters are not within the second threshold range or ranges of the one or more rated-power parameters (310 NO), then the process 300 continues to act 314.

At act 314, the controller 112 operates the UPS 200 in the backup mode of operation. In one example of the backup mode, the controller 112 controls the switch 204 to open such that the capacitor 202 is decoupled from the input 102. The backup mode may be substantially similar or identical to the backup mode of operation discussed above with respect to the UPS 100. For example, the controller 112 may operate the DC/DC converter 108 to draw and convert DC power received from the energy-storage device 126, provide the DC power to the DC/AC inverter 114 via the DC busses 106, and control the DC/AC inverter 114 to convert the DC power to the AC power to be provided to the output 116. The process 300 may then return to act 302, whereby the controller 112 repeats acts 302-310.

As discussed above, in some examples of the pass-through mode of operation the controller 112 controls the switch 204 to close, thereby coupling the capacitor 202 to the input 102. The controller 112 may operate the series power injector 206 to generate a voltage across the capacitor 202 to correct deviations between the input power and the rated power while in the pass-through mode of operation.

For example, if the input voltage is less than the rated load voltage, then the controller 112 may control the series power injector 206 to generate additional voltage across the capacitor 202. The additional voltage may be based on (for example, equal to) the difference between the input voltage and the rated load voltage. For example, if the input voltage is 150 V and the rated load voltage is 230 V, then the controller 112 may operate the series power injector 206 to generate an additional 80 V across the capacitor 202 such that the voltage on the output 116 side of the capacitor 202 is 80 V higher than the voltage on the switch 204 side of the capacitor 202.

In various examples, the voltage generated by the series power injector 206 may be derived from the input 102. For example, the controller 112 may operate the AC/DC converter 104 to draw additional power from the input 102 and provide the additional power to the series power injector 206 via the DC busses 106, DC/DC converter 108, and, in some examples, the energy-storage-device interface 110. In another example, the power may be derived from the energy-storage device 126 and provided to the series power injector 206.

In another example, if the input voltage is greater than the rated load voltage, then the controller 112 may control the series power injector 206 to generate an opposing voltage across the capacitor 202. The opposing voltage may be based on (for example, equal to) the difference between the input voltage and the rated load voltage. For example, if the input voltage is 270 V and the rated load voltage is 230 V, then the controller 112 may operate the series power injector 206 to generate an opposing 40 V across the capacitor 202 such that the voltage on the output 116 side of the capacitor 202 is 40 V lower than the voltage on the switch 204 side of the capacitor 202.

In various examples, the power absorbed by the series power injector 206 may be provided to the energy-storage device 126. For example, the controller 112 may operate the series power injector 206 to provide the excess power to the energy-storage device 126. In some examples, the controller 112 may operate the DC/AC inverter 114 as a grid-connected inverter to provide a desired additional current to the output 116. If the input current received at the input 102 is below a rated current as a result of the overvoltage, the controller 112 may operate the series power injector 206, DC/DC converter 108, and/or DC/AC inverter 114 to supplement the input current. For example, if the input current is 5.5 A and the rated output current is 6.5 A, the controller 112 may operate the series power injector 206, DC/DC converter 108, and DC/AC inverter 114 to provide an additional 1 A of current to the output 116.

Figure 4:
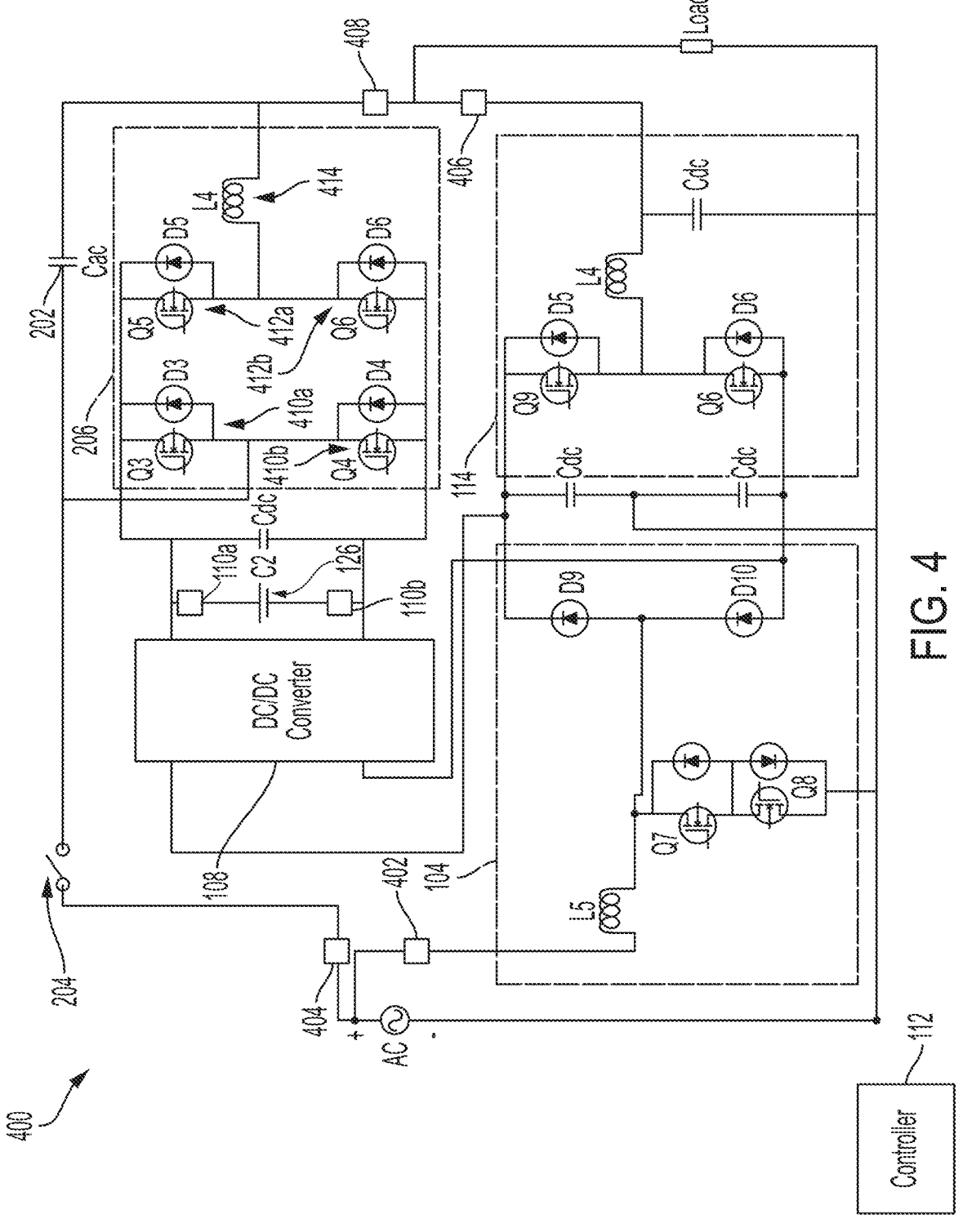
FIG. 4 illustrates a schematic diagram of an example of the UPS of FIG. 2 according to an example.

FIG. 4 illustrates a schematic diagram 400 of the UPS 200 according to an example. The schematic diagram 400 illustrates one example of the UPS 200, and examples of like components are labeled accordingly. The schematic diagram 400 includes the AC/DC converter 104, the DC/DC converter 108, a first energy-storage-device-interface connection 110a, a second energy-storage-device-interface connection 110b, the controller 112, the DC/AC inverter 114, the energy-storage device 126, the capacitor 202, the switch 204, and the series power injector 206. The schematic diagram 400 further includes a first input 402, a second input 404, a first output 406, and a second output 408. The inputs 402, 404 may be an example of the input 102 which, as discussed above, may include multiple input connections. The outputs 406, 408 may be an example of the output 116 which, as discussed above, may include multiple output connections. The series power injector 206 includes a first switching leg including a first upper switching device 410a and a first lower switching device 410b, a second switching leg including a second upper switching device 412a and a second lower switching device 412b, and an output inductor 414.

The first input 402 is configured to be coupled to a power source (for example, an AC-power source), and is coupled to the AC/DC converter 104. The second input 404 is configured to be coupled to the power source, and is coupled to the switch 204. The first output 406 is configured to be coupled to a load, and is coupled to the DC/AC inverter 114. The second output 408 is configured to be coupled to the load, and is coupled to the capacitor 202 and the output inductor 414.

The first upper switching device 410a is coupled to the DC/DC converter 108 and the first energy-storage-device-interface connection 110a at a first connection, and is coupled to the capacitor 202, the switch 204, and the first lower switching device 410b at a second connection. The first lower switching device 410b is coupled to the capacitor 202, the switch 204, and the first upper switching device 410a at a first connection, and is coupled to the DC/DC converter 108 and the second energy-storage-device-interface connection 110b at a second connection.

The second upper switching device 412a is coupled to the DC/DC converter 108 and the first energy-storage-device-interface connection 110a at a first connection, and is coupled to the output inductor 414 and the second lower switching device 412b at a second connection. The second lower switching device 412b is coupled to the output inductor 414 and the second upper switching device 412a at a first connection, and is coupled to the DC/DC converter 108 and the second energy-storage-device-interface connection 110b at a second connection.

The output inductor 414 is coupled to a midpoint of the second switching devices 412a, 412b at a first connection, and is coupled to the second output 408 at a second connection. The first energy-storage-device-interface connection 110a is coupled to the DC/DC converter 108, the first upper switching device 410a, and the second upper switching device 412a, and is configured to be coupled to a first terminal (for example, a positive terminal) of the energy-storage device 126. The second energy-storage-device-interface connection 110b is coupled to the DC/DC converter 108, the first lower switching device 410b, and the second lower switching device 412b, and is configured to be coupled to a second terminal (for example, a negative terminal) of the energy-storage device 126.

The capacitor 202 may be coupled in series with the second output 408. For example, when the series power injector 206 is not providing power to the capacitor 202, the capacitor 202 may be in series between the switch 204 and the second output 408. The switch 204, in turn, may be coupled in series between the capacitor 202 and the second input 404. Accordingly, the switch 204 may be controlled to switchably couple the second input 404 to the second output 408 via the capacitor 202. In some examples, the controller 112 may control the DC/AC inverter 114 to disable inverter output power to the output 116 while controlling the switch 204 to couple the second input 404 to the second output 408.

In various examples, the series power injector 206 may be implemented pursuant to a bi-directional H-bridge topology including the first switching leg (including the first switching devices 410a, 410b) and the second switching leg (including the second switching devices 412a, 412b). The controller 112 may control the switching states of the switching devices 410a, 410b, 412a, 412b to generate a desired voltage across the capacitor 202. For example, if the input voltage exceeds the rated load voltage, the controller 112 may control the switching devices 410a, 410b, 412a, 412b to absorb power from the capacitor 202 by generating a voltage across the capacitor 202 such that a voltage on the second output 408 side of the capacitor 202 is lower than the switch 204 side of the capacitor 202. If the input voltage is less than the rated load voltage, the controller 112 may control the switching devices 410a, 410b, 412a, 412b to provide additional power to the capacitor 202 by generating a voltage across the capacitor 202 such that the switch 204 side of the capacitor 202 is lower than the second output 408 side of the capacitor 202.

Various controllers, such as the controller 112, may execute various operations discussed above. Using data stored in associated memory and/or storage, the controller 112 also executes one or more instructions stored on one or more non-transitory computer-readable media, which the controller 112 may include and/or be coupled to, that may result in manipulated data. In some examples, the controller 112 may include one or more processors or other types of controllers. In one example, the controller 112 is or includes at least one processor. In another example, the controller 112 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power system comprising:
a first output configured to be coupled to a load;
a first input configured to be coupled to a power source;
a switch configured to switchably couple the first input to the first output;
a series power injector coupled to a capacitor, the capacitor being electrically connected in series between the switch and the first output; and
at least one controller configured to
control the switch to couple the first input to the first output, and
disable, based on controlling the switch to couple the first input to the first output, an inverter output power to the load.

2. The power system of claim 1, further comprising:
an AC/DC converter coupled to a second input at a first connection and coupled to a DC bus at a second connection; and
a DC/AC inverter coupled to the DC bus at a third connection and to a second output at a fourth connection, the DC/AC inverter being configured to provide the inverter output power to the load.

3. The power system of claim 2, wherein the series power injector is coupled in parallel with a combination of the AC/DC converter and the DC/AC inverter.

4. The power system of claim 2, wherein the at least one controller is further configured to:
control the switch to decouple the first input from the first output; and
control the AC/DC converter and the DC/AC inverter to provide the inverter output power to the load.

5. The power system of claim 4, wherein the at least one controller is configured to control the switch to decouple the first input from the first output responsive to determining that input power received from the power source does not satisfy at least one acceptable-power criterion.

6. The power system of claim 1, further comprising a DC/DC converter coupled to a DC bus at a first connection and being configured to be coupled to an energy-storage device at a second connection.

7. The power system of claim 6, wherein the series power injector is coupled to the DC/DC converter and is configured to be coupled to the energy-storage device.

8. The power system of claim 6, wherein the series power injector is coupled to the DC/DC converter, and is coupled in parallel with the capacitor.

9. The power system of claim 1, wherein the at least one controller is configured to:
determine a received voltage of power received at the first input;
determine a rated voltage of the load;
determine a voltage difference between the received voltage and the rated voltage; and
control the series power injector to generate the voltage difference across the capacitor.

10. The power system of claim 9, wherein the received voltage is greater than the rated voltage.

11. The power system of claim 9, wherein the received voltage is less than the rated voltage.

12. A power system comprising:
a first output configured to be coupled to a load;
a first input configured to be coupled to a power source;
a switch configured to switchably couple the first input to the first output;
a series power injector coupled to a capacitor, the capacitor being coupled in series with the first output, wherein the series power injector is coupled in parallel with the capacitor; and
at least one controller configured to
control the switch to couple the first input to the first output, and
disable, based on controlling the switch to couple the first input to the first output, an inverter output power to the load.

13. The power system of claim 1, wherein the capacitor is coupled in series with the switch.

14. The power system of claim 1, wherein the first input is coupled to a second input.

15. The power system of claim 1, wherein the first output is coupled to a second output.

16. The power system of claim 1, further comprising a DC/AC inverter coupled to a second output and being configured to provide the inverter output power to the load, wherein disabling the inverter output power to the load includes the at least one controller controlling the DC/AC inverter to stop providing the inverter output power to the load.

17. A non-transitory computer-readable medium storing thereon sequences of computer-executable instructions for controlling a power system having a first output configured to be coupled to a load, a first input configured to be coupled to a power source, a switch configured to switchably couple the first input to the first output, and a series power injector coupled to a capacitor, the capacitor being electrically connected in series between the switch and the first output, the sequences of computer-executable instructions including instructions that instruct at least one processor to:
control the switch to couple the first input to the first output via the capacitor; and

13

14 disable, based on controlling the switch to couple the first input to the first output, an inverter output power to the load.

18. The non-transitory computer-readable medium of claim 17, wherein the at least one processor is further configured to:

determine a received voltage of power received at the first input;

determine a rated voltage of the load;

determine a voltage difference between the received voltage and the rated voltage; and control the series power injector to generate the voltage difference across the capacitor.

19. The non-transitory computer-readable medium of claim 18, wherein the received voltage is greater than the rated voltage.

20. The non-transitory computer-readable medium of claim 18, wherein the received voltage is less than the rated voltage.

* * * * *